(12) United States Patent
Shen et al.

(10) Patent No.: US 11,837,900 B2
(45) Date of Patent: Dec. 5, 2023

(54) BATTERY CAPACITY REPRESENTATION METHOD AND RELATED COMPUTER SYSTEM

(71) Applicant: Wistron Corporation, New Taipei (TW)

(72) Inventors: Chih-Teng Shen, New Taipei (TW); Liang-Fang Wan, New Taipei (TW); Jen-Wei Kuo, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 17/385,887

(22) Filed: Jul. 26, 2021

(65) Prior Publication Data
US 2022/0376533 A1   Nov. 24, 2022

(30) Foreign Application Priority Data
May 18, 2021   (TW) .................................. 110117858

(51) Int. Cl.
*H02J 7/00*   (2006.01)
*G06F 1/16*   (2006.01)
*G06F 1/28*   (2006.01)

(52) U.S. Cl.
CPC .......... *H02J 7/0048* (2020.01); *G06F 1/1684* (2013.01); *G06F 1/28* (2013.01)

(58) Field of Classification Search
CPC ......... H02J 7/0048; G06F 1/1684; G06F 1/28
See application file for complete search history.

(56) References Cited

U.S. PATENT DOCUMENTS

| | | | |
|---|---|---|---|
| 2015/0106643 A1* | 4/2015 | Lin .................... | G01R 19/0084 713/340 |
| 2016/0049066 A1* | 2/2016 | Henderson ........... | A61B 8/4427 340/679 |
| 2020/0142533 A1* | 5/2020 | Seo ......................... | G06F 3/044 |
| 2020/0348745 A1* | 11/2020 | Hamlin .................. | G06F 3/017 |
| 2021/0018534 A1* | 1/2021 | Li ......................... | G01R 31/001 |
| 2021/0306022 A1* | 9/2021 | Fernando ............... | H01Q 1/243 |

FOREIGN PATENT DOCUMENTS

| | | |
|---|---|---|
| TW | M366106 U1 | 10/2009 |
| TW | 200945858 | 11/2009 |

\* cited by examiner

*Primary Examiner* — Zhipeng Wang
(74) *Attorney, Agent, or Firm* — Winston Hsu

(57) ABSTRACT

A battery capacity representation method for a computer system, is disclosed. The computer system includes a specific absorption rate (SAR) sensor, a battery module and a light-emitting diode (LED) module, and the battery capacity representation method includes performing an external environment sensing by the SAR sensor to determine whether a triggering condition is satisfied; sensing a battery capacity of the battery module when the triggering condition is satisfied; and determining a representation status of the LED module according to the battery capacity.

13 Claims, 2 Drawing Sheets

BATTERY CAPACITY REPRESENTATION METHOD AND RELATED COMPUTER SYSTEM

BACKGROUND OF THE INVENTION

1. Field of the Invention

The present invention relates to a battery capacity representation method and related computer system, and more particularly, to a battery capacity representation method and related computer system capable of rapidly representing information of the battery capacity of the computer system.

2. Description of the Prior Art

A power status of a conventional laptop, e.g. an indication of whether or not the laptop is charging, may be indicated by an external charging light-emitting diode (LED) or a power bottom LED. A user cannot know the battery capacity (such as a remaining battery capacity) of the laptop, however, without turning on the operating system of the laptop. This causes inconvenience to the user.

SUMMARY OF THE INVENTION

In light of this, the present invention provides a battery capacity representation method and related computer system to rapidly display information of the battery capacity of the computer system.

An embodiment of the present invention discloses a battery capacity representation method for a computer system, wherein the computer system includes a specific absorption rate (SAR) sensor, a battery module and a light-emitting diode (LED) module, and the battery capacity representation method comprises: performing an external environment sensing by the SAR sensor to determine whether a triggering condition is satisfied; sensing a battery capacity of the battery module when the triggering condition is satisfied; and determining a representation status of the LED module according to the battery capacity.

Another embodiment of the present invention discloses a computer system, comprising: a charging module including a battery module; a circuit board, including a specific absorption rate (SAR) sensor and a light-emitting diode (LED) module, wherein the SAR sensor is configured to perform an external environment sensing and the LED module is configured to present a representation status; and an embedded controller, configured to determine whether a triggering condition is satisfied according to a sensing result determined by the external environment sensing of the SAR sensor, sense a battery capacity of the battery module when the triggering condition is satisfied, and determine the representation status of the LED module according to the battery capacity.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
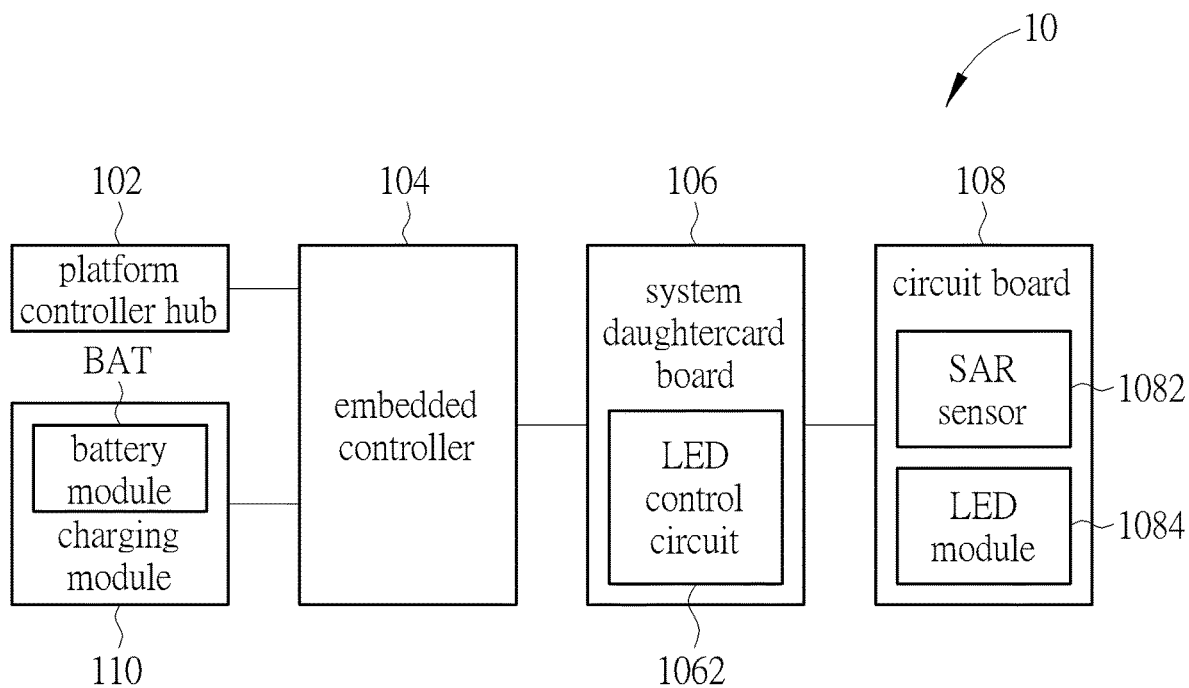
FIG. 1 is a schematic diagram of a computer system according to an embodiment of the present invention.

Refer to FIG. 1, which is a schematic diagram of a computer system 10 according to an embodiment of the present invention. The computer system 10 includes a platform controller hub 102, an embedded controller 104, a system daughtercard board 106, a circuit board 108 and a charging module 110, wherein the system daughtercard board 106 further includes a light-emitting diode (LED) control circuit 1062, and the circuit board 108 may be a flexible printed circuit (FPC), which includes a specific absorption rate (SAR) sensor 1082 and an LED module 1084. The charging module 110 includes a battery module BAT.

The computer system 10 may be a portable electronic device, e.g. a laptop. The platform controller hub 102 may be a main system chip of the computer system 10. The embedded controller 104 is coupled to the platform controller hub 102 for performing an external environment sensing according to a sensing result determined by the SAR sensor, so as to determine whether a triggering condition is satisfied. When the triggering condition is satisfied, a battery capacity of the battery module BAT of the charging module 110 is determined and a representation status of the LED module 1084 is determined accordingly.

The embedded controller 104 of the computer system 10 is thereby configured to determine the battery capacity of the battery module BAT according to the sensing result of the SAR sensor 1082, such that the battery capacity may be represented via the LED module 1084. In addition, since a power source of the embedded controller 104 according to an embodiment of the present invention is provided by a real-time clock circuit of the battery module BAT, the embedded controller 104 may control the SAR sensor 1082 to perform external environment sensing when the computer system 10 is in a power-off status or a power-on status. Therefore, even when the computer system 10 is in the power-off status, the embedded controller 104 may enable the SAR sensor 1082 to perform the external environment sensing so as to represent the battery capacity via the LED module 1084.

Figure 2:
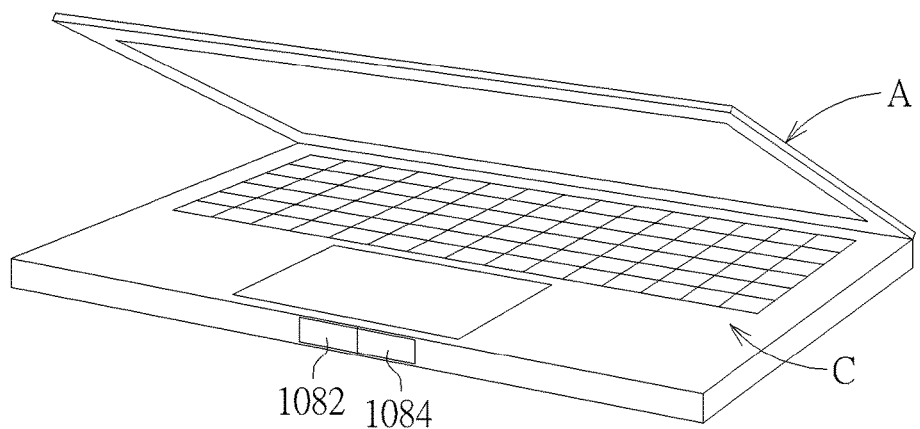
FIG. 2 is a schematic diagram of a layout of a specific absorption rate sensor and a light-emitting diode module according to an embodiment of the present invention.

Refer to FIG. 2, which is a schematic diagram of a layout of the SAR sensor 1082 and the LED module 1084 according to an embodiment of the present invention. In one embodiment, the SAR sensor 1082 and the LED module 1084 may be disposed on a C part of the laptop. More specifically, the SAR sensor 1082 and the LED module 1084 may be disposed close to a touchpad of the laptop, such that the SAR sensor 1082 may be triggered when a user closes a lid of the laptop, and the battery capacity may be clearly displayed via the LED module 1084.

Notably, dispositions of the SAR sensor 1082 and the LED module 1084 are not limited to the above embodiments; in other embodiments, the SAR sensor 1082 and the LED module 1084 may be disposed on a side of an A part of the laptop for display.

In an embodiment of the present invention, the SAR sensor 1082 includes a first sensing point and a second sensing point for performing the external environment sensing according to a sliding sensing being a sliding touch input. Therefore, when sensing values of the first sensing point and the second sensing point of the SAR sensor 1082 are larger than a triggering value, i.e. when the SAR sensor 1082 senses that an object touches the first sensing point and slides from the first sensing point towards the second sensing point, the triggering condition is determined to be satisfied, and is reported to the embedded controller 104 accordingly.

More specifically, the triggering condition is satisfied when the sensing values of the first sensing point and the second sensing point are larger than the triggering value. The embedded controller 104 is then notified. Under this situation, the embedded controller 104 may read the battery capacity of the battery module BAT of the charging module 110 accordingly, and determine the representation status of the LED module 1084 according to a current battery capacity.

The sensing values of the first sensing point and the second sensing point may be obtained by quantizing charges received by the first sensing point and the second sensing point of the SAR sensor 1082, such that when the sensing values (i.e. received charges) of the first sensing point and the second sensing point are larger than a default triggering value, the triggering condition is satisfied, and the embedded controller 104 is notified. Notably, a number of the sensing points is not limited to two; other numbers of sensing points are applicable to the present invention.

In detail, the LED module 1084 according to an embodiment of the present invention includes a plurality of LEDs, such that the embedded controller 104 of the computer system 10 may control the representation status of the LED module 1084 according to the battery capacity. For example, the embedded controller 104 may control a first LED of the LED module 1084 to display a single color, e.g. orange or red, via the LED control circuit 1062 to represent that the computer system 10 is in a low power status. The embedded controller 104 may also or alternatively control a plurality of second LEDs of the LED module 1084 to display a color, which may be the same or different from the first LED, to represent a corresponding battery capacity.

In an embodiment, a particular number of turned on LEDs may correspond to a particular battery capacity, and different numbers of turned on LEDs may correspond to other battery capacities. For example, when the remaining battery capacity is 80%-100%, the embedded controller 104 is configured to control the LED module 1084 to turn on five LEDs; when the remaining battery capacity is 60%-80%, the embedded controller 104 is configured to control the LED module 1084 to turn on four LEDs; when the remaining battery capacity is 40%-60%, the embedded controller 104 is configured to control the LED module 1084 to turn on three LEDs; when the remaining battery capacity is 20%-40%, the embedded controller 104 is configured to control the LED module 1084 to turn on two LEDs; and when the remaining battery capacity is 10%-20%, the embedded controller 104 is configured to control the LED module 1084 to turn on one LED. Therefore, the LED module 1084 according to an embodiment of the present invention may display the representation status corresponding to different battery capacities, such that the user may rapidly obtain the battery capacity of the computer system 10 in a more convenient way.

Notably, the above example illustrates specific numbers of LEDs of the LED module 1084 which are turned on to represent a corresponding battery capacity, but these numbers are not limited thereto and can be modified according to different systems and hardware requirements.

Figure 3:
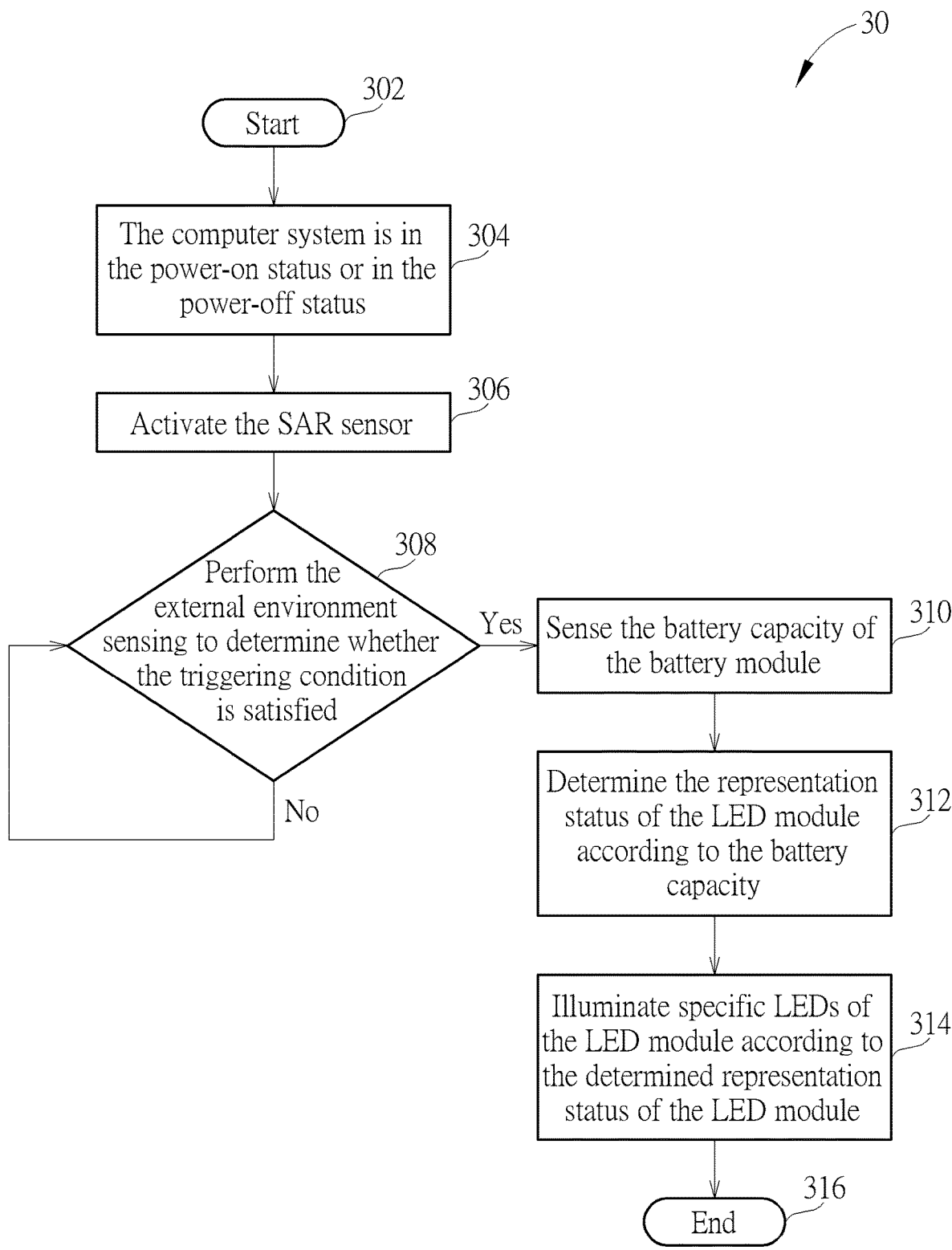
FIG. 3 is a schematic diagram of a battery capacity representation method according to an embodiment of the present invention.

Furthermore, an operation method of the computer system 10 may be illustrated as a battery capacity representation method, as shown in FIG. 3. The battery capacity representation method 30 includes the following steps:

Step 302: Start.
Step 304: The computer system 10 is in the power-on status or in the power-off status;
Step 306: Activate the SAR sensor 1082;
Step 308: Perform the external environment sensing to determine whether the triggering condition is satisfied; If yes, go to step 308; If no, go to step 310;
Step 310: Sense the battery capacity of the battery module BAT;
Step 312: Determine the representation status of the LED module 1084 according to the battery capacity;
Step 314: Illuminate specific LEDs of the LED module 1084 according to the determined representation status of the LED module 1084;
Step 316: End.

Operations of the battery capacity representation method 30 can be understood by referring to the above embodiments regarding the computer system 10, and are not narrated herein for brevity.

In summary, the present invention provides a battery capacity representation method and related computer system, which senses the external environment status via the SAR sensor to determine whether to detect the battery capacity. The corresponding battery capacity may be displayed on the LED module, such that the user may rapidly learn the battery capacity of the computer system without turning on an operating system of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A battery capacity representation method for a computer system, wherein the computer system includes a specific absorption rate (SAR) sensor, a battery module and a light-emitting diode (LED) module, and the battery capacity representation method comprises:
    performing an external environment sensing by the SAR sensor to determine whether a triggering condition is satisfied;
    sensing a battery capacity of the battery module when the triggering condition is satisfied; and
    determining a representation status of the LED module according to the battery capacity;
    wherein the SAR sensor includes a first sensing point and a second sensing point, and the method determines the triggering condition is satisfied when sensing values of the first sensing point and the second sensing point are larger than a triggering value;
    wherein the SAR sensor is configured to perform the external environment sensing by a sliding sensing being a sliding touch input.

2. The battery capacity representation method of claim 1, further comprising:
    displaying the representation status of the LED module according to the battery capacity via a plurality of light-emitting diodes of the LED module.

3. The battery capacity representation method of claim 2, wherein a first LED of the plurality of LEDs is configured to represent a low power status of the battery capacity.

4. The battery capacity representation method of claim 2, wherein an amount of a plurality of second LEDs of the plurality of LEDs represents a corresponding battery capacity, and the method further comprises:
  turning on the amount of second LEDs to represent the corresponding battery capacity.

5. The battery capacity representation method of claim 1, wherein the computer system further includes an embedded controller, a power source of the embedded controller is provided by a real-time clock circuit, and the embedded controller is configured to control the SAR sensor for performing the external environment sensing when the computer system is in a power-off status or a power-on status.

6. The battery capacity representation method of claim 1, wherein the computer system is a portable electronic device.

7. A computer system, comprising:
  a charging module including a battery module;
  a circuit board, including a specific absorption rate (SAR) sensor and a light-emitting diode (LED) module, wherein the SAR sensor is configured to perform an external environment sensing and the LED module is configured to display a representation status; and
  an embedded controller, configured to determine whether a triggering condition is satisfied according to a sensing result determined by the external environment sensing of the SAR sensor, sense a battery capacity of the battery module when the triggering condition is satisfied, and determine the representation status of the LED module according to the battery capacity;
  wherein the SAR sensor includes a first sensing point and a second sensing point, wherein when sensing values of the first sensing point and the second sensing point are larger than a triggering value, it is determined the triggering condition is satisfied;
  wherein the SAR sensor is configured to perform the external environment sensing by a sliding sensing being a sliding touch input.

8. The computer system of claim 7, wherein the embedded controller is configured to display the representation status of the LED module according to the battery capacity via a plurality of light-emitting diodes of the LED module.

9. The computer system of claim 8, wherein a first LED of the plurality of LEDs is configured to represent a low power status of the battery capacity.

10. The computer system of claim 8, wherein an amount of a plurality of second LEDs of the plurality of LEDs represents a corresponding battery capacity, and the embedded controller turns on the amount of second LEDs to represent the corresponding battery capacity.

11. The computer system of claim 7, wherein a power source of the embedded controller is provided by a real-time clock circuit, and the embedded controller is configured to control the SAR sensor for performing the external environment sensing when the computer system is in a power-off status or a power-on status.

12. The computer system of claim 7, wherein the computer system is a portable electronic device.

13. The computer system of claim 7, further comprising:
  a system daughtercard board, including an LED control circuit, configured to control the representation status of the LED module.

* * * * *